US010212708B2

(12) United States Patent
Taylor

(10) Patent No.: US 10,212,708 B2
(45) Date of Patent: Feb. 19, 2019

(54) METHOD AND APPARATUS FOR RESOURCE ALLOCATION FOR UNLICENSED SPECTRUM IN NEW RADIO (NR)

(71) Applicant: ZTE (USA) Inc., Austin, TX (US)

(72) Inventor: Carolyn Taylor, Homewood, IL (US)

(73) Assignee: ZTE (USA) Inc., Richardson, TX (US)

( * ) Notice: Subject to any disclaimer, the term of this patent is extended or adjusted under 35 U.S.C. 154(b) by 0 days.

(21) Appl. No.: 15/670,417

(22) Filed: Aug. 7, 2017

(65) Prior Publication Data

US 2018/0042019 A1   Feb. 8, 2018

Related U.S. Application Data

(60) Provisional application No. 62/371,994, filed on Aug. 8, 2016.

(51) Int. Cl.
*H04W 72/00* (2009.01)
*H04W 72/04* (2009.01)
*H04W 16/14* (2009.01)

(52) U.S. Cl.
CPC ....... *H04W 72/0453* (2013.01); *H04W 16/14* (2013.01)

(58) Field of Classification Search
CPC .......................... H04W 72/0453; H04W 16/14
USPC ...... 455/454, 452.1, 452.2, 450, 446, 67.13, 455/63.1, 62
See application file for complete search history.

(56) References Cited

U.S. PATENT DOCUMENTS

| 7,151,757 | B2* | 12/2006 | Beasley | H04B 7/2662 370/331 |
| 7,194,010 | B2* | 3/2007 | Beasley | H04B 7/2662 370/282 |
| 8,768,372 | B2* | 7/2014 | Khandekar | H04W 16/10 370/332 |
| 9,681,490 | B1* | 6/2017 | Kakinada | H04W 36/08 |
| 9,847,944 | B2* | 12/2017 | Chow | H04L 47/125 |
| 2009/0017829 | A1* | 1/2009 | Laroia | H04W 16/12 455/446 |
| 2011/0039554 | A1* | 2/2011 | Bims | H04L 1/0033 455/434 |
| 2012/0163309 | A1* | 6/2012 | Ma | H04B 7/2606 370/329 |
| 2012/0282942 | A1* | 11/2012 | Uusitalo | H04W 16/14 455/452.2 |
| 2013/0077554 | A1* | 3/2013 | Gauvreau | H04W 72/0453 370/312 |
| 2014/0071967 | A1* | 3/2014 | Velasco | H04L 12/1403 370/338 |
| 2014/0073288 | A1* | 3/2014 | Velasco | H04W 4/02 455/411 |
| 2014/0073289 | A1* | 3/2014 | Velasco | H04W 12/04 455/411 |

(Continued)

*Primary Examiner* — Marceau Milord
(74) *Attorney, Agent, or Firm* — Drinker Biddle & Reath LLP

(57) ABSTRACT

Method and apparatus for allocating radio resources for use by mobile user equipment (UE), including sensing available radio spectrum resources, allocating at least a portion of the sensed available resources for use by at least one UE, detecting changes in the radio resource usage situation, and modifying the allocation of resources based at least in part on the detected changes in the radio resource usage situation.

9 Claims, 3 Drawing Sheets

(56) References Cited

U.S. PATENT DOCUMENTS

| | | | |
|---|---|---|---|
| 2014/0274078 A1* | 9/2014 | Hyde | H04W 16/18 |
| | | | 455/446 |
| 2014/0376370 A1* | 12/2014 | Cioffi | H04L 45/245 |
| | | | 370/230 |
| 2015/0271834 A1* | 9/2015 | Ma | H04W 72/085 |
| | | | 370/329 |
| 2016/0227427 A1* | 8/2016 | Vajapeyam | H04W 72/085 |
| 2017/0359851 A1* | 12/2017 | Kakinada | H04W 76/066 |

\* cited by examiner

METHOD AND APPARATUS FOR RESOURCE ALLOCATION FOR UNLICENSED SPECTRUM IN NEW RADIO (NR)

CROSS-REFERENCE TO RELATED APPLICATIONS

This application claims priority to U.S. Application No. 62/371,994, filed Aug. 8, 2016, which is incorporated herein by reference in its entirety.

BACKGROUND

Field

The present disclosure relates generally to communication, and more specifically to techniques for allocating radio resources using both licensed and unlicensed spectrum in a wireless communication system.

BRIEF DESCRIPTION OF DRAWINGS

The accompanying drawings are included to provide a further understanding of the invention, and are incorporated in and constitute a part of this specification. The drawings illustrate disclosed embodiments and/or aspects and, together with the description, serve to explain the principles of the invention, the scope of which is determined by the claims. In the drawings:

BACKGROUND AND DETAILED DESCRIPTION

It is to be understood that the figures and descriptions provided herein may have been simplified to illustrate aspects that are relevant for a clear understanding of the herein disclosed processes, machines, manufactures, and/or compositions of matter, while eliminating for the purpose of clarity other aspects that may be found in typical devices, systems, and methods. Those of ordinary skill in the pertinent art may recognize that other elements and/or steps may be desirable and/or necessary to implement the devices, systems, and methods described herein. Because such elements and steps are well known in the art, and because they do not facilitate a better understanding of the present disclosure, a discussion of such elements and steps may not be provided herein. However, the present disclosure is deemed to inherently include all such elements, variations, and modifications to the described aspects that would be known to those of ordinary skill in the pertinent art. Furthermore, the following descriptions are provided as teaching examples and should not be construed to limit the scope of the invention. Rather, the scope of the invention is defined by the claims. Although specific details may be disclosed, embodiments may be modified by changing, supplementing, or eliminating many of these details.

Carrier aggregation including both licensed and unlicensed spectrum, is one way to squeeze more communication capacity from the finite range of radio frequency resources. Some sort of this type of carrier aggregation will be implemented for use by user equipment (UE) such as smart phones, UE equipped vehicles, and the like in upcoming releases of cellular communication standards. It is commonly known that a great deal of the radio spectrum has been licensed in countries around the world by wireless system operators, for example radio spectrum licensed by phone companies for use in providing cellular voice and data services. In addition, there exists significant unregulated radio spectrum that may also be taken advantage of by UEs, either alone or in combination with licensed spectrum. Assembling disparate slices of radio spectrum to form communication channels is called carrier aggregation (CA). CA may be used to increase channel bandwidth, and thereby increase communication bitrate. CA may also be used to increase the number of available channels compared to the number that can be implemented using only licensed radio spectrum.

Figure 1:
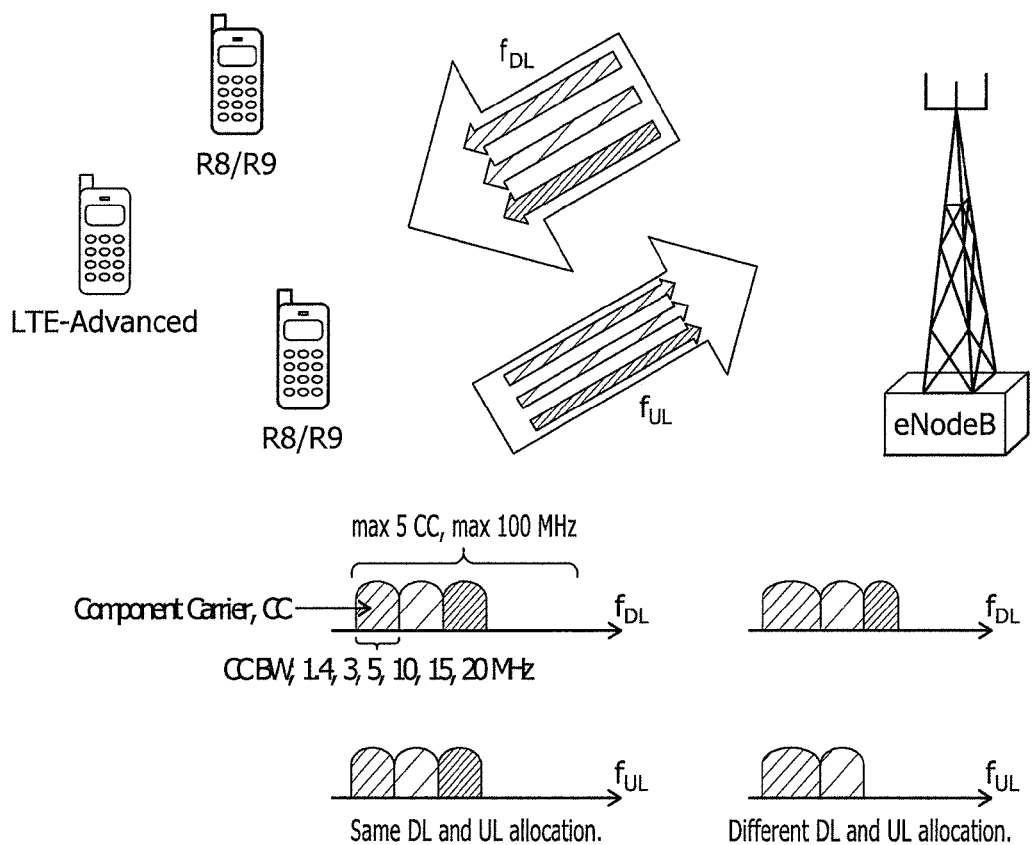
FIG. 1 illustrates carrier aggregation (CA) using LTE-Advanced FDD resources.

As new communication capabilities and approaches are incorporated into new communication standards, it is important to implement them in a manner that maintains backward compatibility with, and continuing operation of, UEs already deployed that are compliant with earlier standards. For example, CA can be used either for FDD, TDD, or both. FIG. 1 illustrates an example of carrier aggregation using FDD. The figure is from a work entitled "Carrier Aggregation Explained", authored by Jeanette Wannstrom for 3GPP and submitted in June 2013. This work is published on 3GPPs web site and at this writing is publicly available from http://www.3gpp.org/technologies/keywords-acronyms/101-carrier-aggregation-explained, hereby incorporated by reference in its entirety as if fully set forth herein. FIG. 1 illustrates that an LTE-Advanced (LTE-A) UE can be allocated DL and UL resources that are aggregated into a channel comprising a plurality of component carriers (CCs). The aggregated CCs can have different, non-adjacent licensed and/or unlicensed bandwidths. Concurrently, R8/R9 UEs can be allocated resources on just one licensed carrier, which may be shared with the LTE-A UE.

In embodiments, each CC may have one of a plurality of predetermined bandwidths, for example, one of 1.4, 3, 5, 10, 15 or 20 MHz, although other values may be used. In an embodiment, as many as five component carriers can be aggregated, although other quantities of CCs may be defined as a maximum. The aggregated bandwidth is simply the total of the (non-overlapping) bandwidths of the CCs. In FDD, the number of aggregated carriers may be different in DL and UL. Alternatively, the number of UL CCs in an aggregated UL carrier in an embodiment may be required to be equal to or lower than the number of DL CCs in an aggregated DL carrier. Individual CCs may also have equal and/or different bandwidths. In a TDD embodiment, the quantity of CCs and the bandwidths of each CC may normally be the same for DL and UL carrier aggregation.

Figure 2:
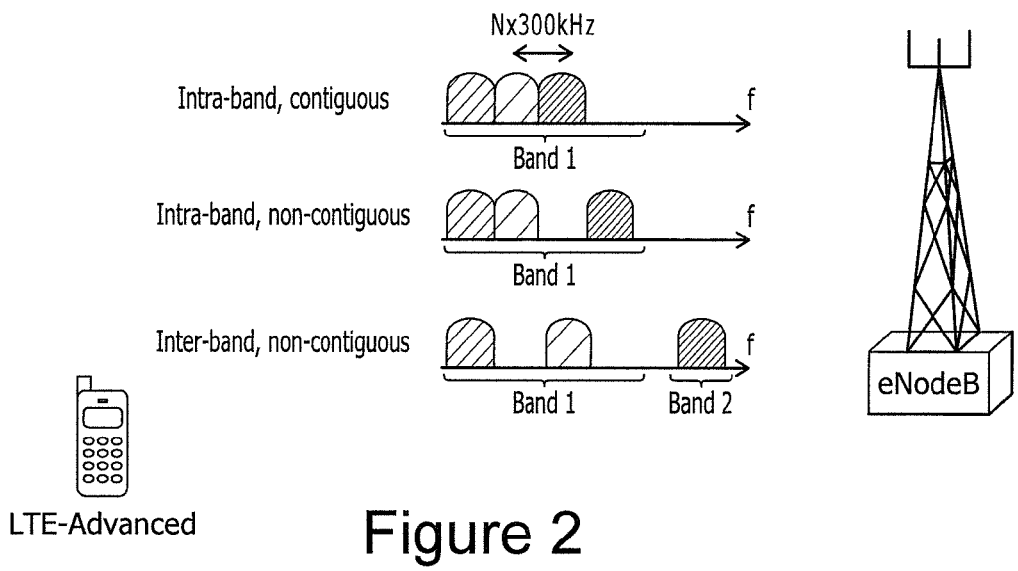
FIG. 2 shows intra-band and inter-band carrier aggregation alternatives.

As illustrated in FIG. 2, aggregated resources may comprise contiguous component carriers within the same operating frequency band, so called intra-band contiguous, for example, frequency bands defined for LTE although other frequency bands may additionally or alternatively be used. Using contiguous CCs is not necessary however, and might not even be possible, for example due to operator frequency allocation scenarios that preclude using contiguous CCs. For non-contiguous allocation, an aggregated resource may be either intra-band (i.e. the CCs belong to the same operating frequency band, but with one or more gaps in between); or the aggregated resource may be inter-band (i.e., the CCs belong to different operating frequency bands). In FIG. 2, both intra-band and inter-band aggregation alternatives are illustrated. In an embodiment, the spacing between the center frequencies of adjacent CCs may be N×300 kHz, N=integer, although other spacings may be used. For the non-contiguous cases, some or all of the CCs are separated by frequency gap(s).

Figure 3:
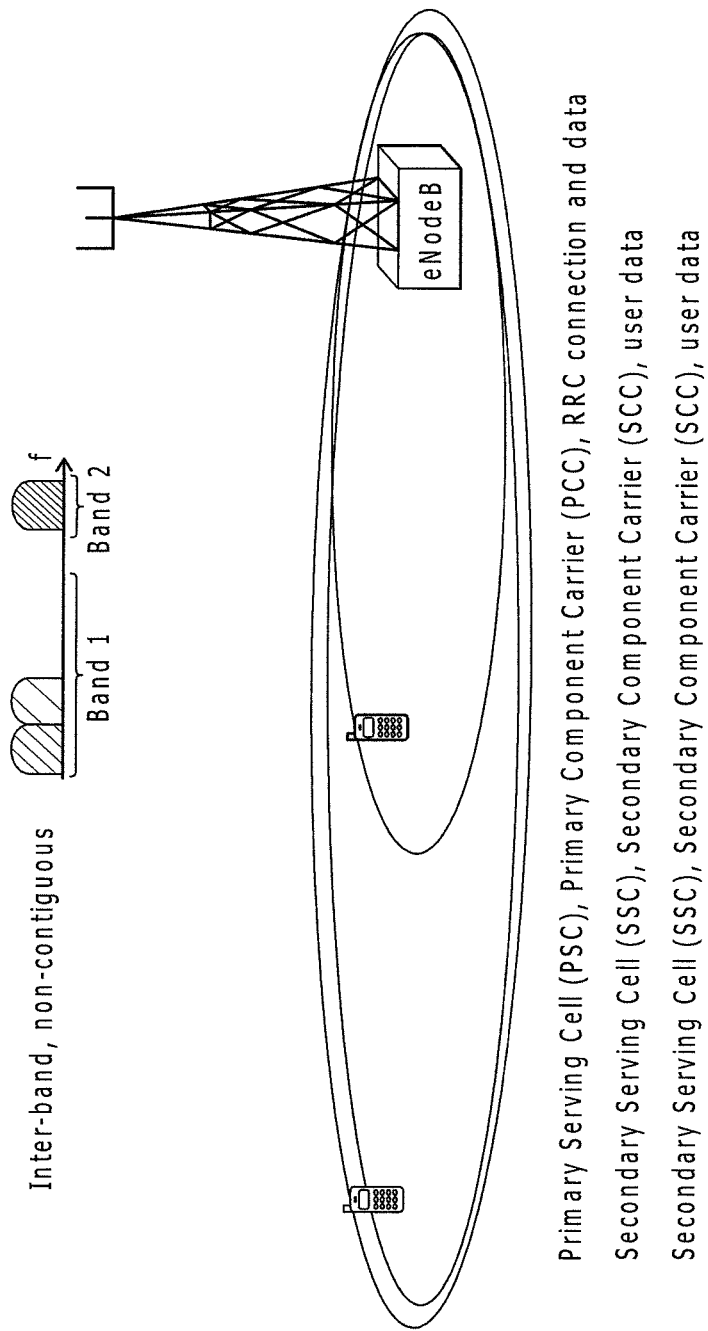
FIG. 3 shows CA using carriers from both primary and secondary serving cells.

The carriers that are aggregated may all be from the same serving cell, or may be from a plurality of serving cells, with each CC being from a particular cell. The service areas of such serving cells may differ, for example in the case CCs on different frequency bands experience different path loss. FIG. 3 illustrates carrier aggregation using carriers from two serving cells, designated as Primary and Secondary serving cells. As shown, each aggregated component carrier corresponds to a single serving cell. The different serving cells may have different, at least partially overlapping coverage areas. In the illustrated embodiment, the Radio Resource Control (RRC) connection may be handled by just one cell, the Primary serving cell, served by the Primary component carrier, for both download and upload (DL and UL PCC). As shown, the UE also receives NAS information on the DL PCC such as security parameters, although other arrangements are possible. In idle mode the UE listens to system information on the DL PCC, while the Physical Uplink Control Channel (PUCCH) is sent on the UL PCC. The other upload and download component carriers are referred to as Secondary component carriers (DL and UL SCC), serving the Secondary serving cells. The SCCs may be added and removed as required, while the PCC is changed only at handover as the UE moves from the service area of one cell to another.

Cells providing the different component carriers may have different service areas, different cell sizes, different directionality, and the like, provided they have at least some overlap in the aggregated CCs. In the case of inter-band carrier, the component carriers may also experience different path loss. It is well known that path loss typically increases with increasing frequency. In the example shown in FIG. 3, carrier aggregation on all three component carriers can only be used for the black UE, because only the black UE is located within the service areas of all three carriers illustrated. In contrast, the white UE is not within the coverage area of the component carrier with the smaller service area. It is noted that UEs using the same set of CCs may have different PCCs.

New and more capable approaches to managing radio access technology (RAT) to provide improved mobile services may be referred to as "new radio" (NR). Improvements being developed for NR include improvements in voice-based communications, for example by reducing the impact of background noise while maintaining the voice. An aspect of this effort includes the revision of the so-called "silence descriptor" (SID). Specific objectives being pursued in relation to unlicensed spectrum in NR include targeting a single technical framework addressing all usage scenarios, requirements, and deployment scenarios defined in 3GPP document TR 38.913 V0.3.0 (2016-03) entitled "Study on Scenarios and Requirements for Next Generation Access Technologies; (Release 14)". These include enhanced mobile broadband; massive machine-type-communications; and ultra reliable and low latency communications. Related documentation includes 3GPP documents RP-161214, a work item description (WID) entitled "Revision of SI: Study on New Radio Access Technology"; R1-164723 entitled "Numerology and Frame Structure for NR-Unlicensed"; and FCC document FCC 16-89 entitled "Report And Order And Further Notice Of Proposed Rulemaking", adopted and released Jul. 14, 2016. All of these documents are hereby incorporated by reference as if fully set forth herein.

In particular, these documents require that the new RAT shall be inherently forward compatible. It is also assumed that the normative specification will occur in two phases: Phase I (to be completed in June 2018) and Phase II (to be completed in December 2019). Phase I specification of the new RAT must be forward compatible with Phase II specification and beyond (in terms of efficient co-cell/site/carrier operation). However, backward compatibility with LIE will not be required. Phase II specification of the new RAT will build on the foundation of Phase I specification, and will meet all the set requirements for the new RAT. Future evolution beyond Phase II then needs to be capable of smoothly supporting later advanced features, and to enable support of service requirements identified later than the Phase II specification.

Further goals are to study and identify the technical features necessary to enable the new radio access to meet objective 1 and 2 of TR 38.913 V0.3.0 (2016-03), also including the following. Tight interworking between the new RAT and LTE. Interworking with non-3GPP systems. Operation in licensed bands (paired and unpaired), and licensed assisted operations in unlicensed bands, possibly including standalone operation in unlicensed bands. Efficient multiplexing of traffic for different services and use cases on the same contiguous block of spectrum. And, standalone operation in licensed bands.

This disclosure henceforth pertains in large measure to resource allocation for unlicensed spectrum in NR. It is noted that one aim of the global regulatory rules is for NR to be capable of utilizing any spectrum made available in the band ranging at least up to 100 GHz. Harmonization of frequency bands for unlicensed spectrum includes 60 GHz. The United States Government through the FCC has already provided new rules for NR operations for 7 GHz of spectrum in unlicensed frequencies above 24 GHz. In particular, the FCC has authorized 7 GHz more of unlicensed spectrum to provide operations in the 64-71 GHz unlicensed band. The Japanese and Korean Governments are planning to allocate 7 GHz as well, the Chinese Government is planning to allocate 5 GHz, and as much as 9 GHz is being planned to be allocated within Europe. The use of unlicensed spectrum in NR is significant because it is needed if NR is to meet the usage scenarios of enhanced mobile broadband (eMBB), massive machine-type-communication (mMTC), and ultra reliable and low latency communication (UrLLC).

The United States has begun the harmonization of frequency bands for unlicensed spectrum in NR on a global basis to meet the important usage scenarios of eMBB, mMTC, and UrLLC. The NR usage scenario performance targets include the following. The eMBB requires low latency and high peak rates. The mMTC requires low energy consumption and extended coverage. And, the UrLLC requires high reliability and large subcarrier spacing and short subframe for low latency.

The overall LTE design principles for licensed assisted access (LAA) operation in unlicensed band include integration with the licensed spectrum, preferably with minimal changes to LTE and guaranteeing fair co-existence with other systems using unlicensed spectrum, such as Wi-Fi. As such, NR embodiments may be expected to satisfy these objectives. In addition however, for unlicensed band operation to meet the NR usage scenario performance targets, embodiments may preferably include flexible resource allocation for unlicensed spectrum. Embodiments may also support flexible resource allocation for unlicensed spectrum.

LTE-compliant embodiments may also allocate resources for unlicensed spectrum, for example in accordance with LAA and enhanced LAA (eLAA), using a type of reservation signal based on an initial signal that allows the eNB to transmit signals for channel reservation. Embodiments use listen-before-talk (LBT), an important feature in unlicensed band operation. The sensing operation may be based on the principle that eNBs willing to transmit data listen to the channel first to determine whether other devices are transmitting on the channel. Embodiments may also use a so-called clear channel assessment (CCA) mechanism to identify other transmissions in the channel. Embodiments use a contention window (CW) parameter to determine the duration of the backoff procedure used to avoid collisions in the presence of a large number of transmitters.

However, these procedures for unlicensed spectrum are not necessarily the most effective for allocating unlicensed spectrum in NR because one objective is to minimize changes to LTE. In contrast to LTE, Wi-Fi it uses carrier sense multiple access with collision avoidance as an LBT scheme. Such collision avoidance methods aim to avoid resource contention by attempting to avoid simultaneous attempts to access the same resource. Collision avoidance can improve packet reception ratio (PRR) by preventing multiple devices from transmitting at the same time using the same resources. The likelihood of collision is reduced and this improves the packet reception ratio (PRR) performance.

However, disclosed embodiments may use one or more other reservation signal methods to allocate unlicensed spectrum resources. For example in an embodiment, a resource reservation signal may be used that has a type of allocation coding with a set of flexible sensing operation window intervals. This embodiment thereby allows the eNB to transmit a resource reservation signal for channel reservation purposes. In an embodiment, a resource reservation signal may be transmitted to reserve channels on which availability of their associated subframe is coded.

Figure 4:
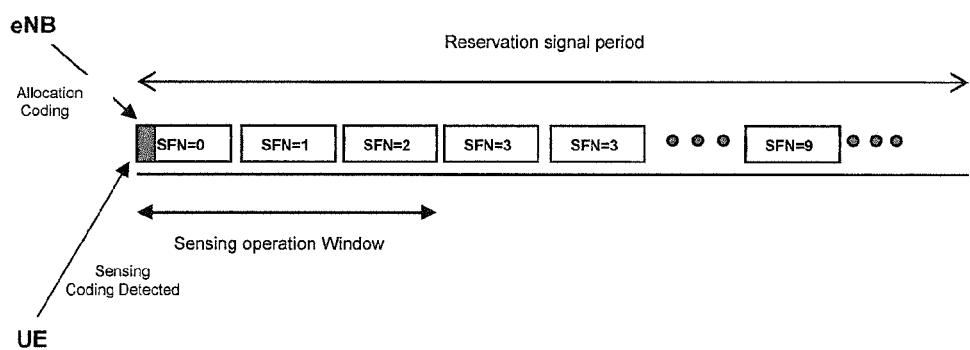
FIG. 4 illustrates exemplary sensing operation for unlicensed spectrum in NR.

FIG. 4 illustrates such resource allocation including unlicensed spectrum. In the figure, each carrier is represented as a single frequency network (SFN). In embodiments, aggregation supports resource reservation. In an embodiment, resource reservation signaling may be used that includes allocation coding, for example, with a set of flexible sensing operation window intervals, although other signaling arrangements may additionally or alternatively be used. Illustratively, an exemplary resource aggregation embodiment may support a resource reservation signal that has a type of allocation coding with a set of flexible sensing operation window intervals. Other allocation coding and signaling may additionally or alternatively be used. In various embodiments, carrier aggregation may be performed by an eNodeB and conveyed to one or more UEs in its service area, or by a UE and conveyed to an eNodeB providing services, or by both an eNodeB and a UE working cooperatively.

Although the invention has been described and illustrated in exemplary forms with a certain degree of particularity, it is noted that the description and illustrations have been made by way of example only. Numerous changes in the details of construction, combination, and arrangement of parts and steps may be made. Accordingly, such changes are intended to be included within the scope of the disclosure, the protected scope of which is defined by the claims. It should be appreciated that, while selected embodiments have been described herein for illustration purposes, various modifications may be made without deviating from the scope of the invention. Accordingly, the invention is not limited except as by the appended claims and the elements explicitly recited therein.

What is claimed is:

1. A method for allocating radio resources for use by mobile user equipment (UE), comprising: sensing available radio spectrum resources; allocating at least a portion of the sensed available resources for use by at least one UE; and detecting changes in the number of UEs requesting radio resources in the service area of an eNodeB; and modifying the allocation of resources based at least in part on the detected changes in the number of UEs requesting radio resources in the service area of an eNodeB, wherein the allocation includes using a resource reservation signal having allocation coding with a set of flexible sensing operation window intervals, and wherein the resource reservation signal is used to reserve at least one channel on which availability of associated subframes is coded.

2. The method of claim 1, wherein the sensing is limited to licensed spectrum.

3. The method of claim 1, wherein the sensing is limited to unlicensed spectrum.

4. The method of claim 1, wherein the sensing includes both licensed and unlicensed spectrum.

5. Apparatus allocating radio resources for use by mobile user equipment (UE), comprising: at least one sensor for sensing available radio spectrum resources; a first circuit for allocating at least a portion of the sensed available resources for use by at least one UE; and a second circuit for recognizing changes in the capability of at least one UE using radio resources in the service area of an eNodeB; and a third circuit for modifying the allocation of resources based at least in part on the detected changes in the capability of at least one UE using radio resources in the service area of an eNodeB, wherein the allocation includes using a resource reservation signal having allocation coding with a set of flexible sensing operation window intervals, and wherein the resource reservation signal is used to reserve at least one channel on which availability of associated subframes is coded.

6. The apparatus of claim 5, wherein the sensing is limited to licensed spectrum.

7. The apparatus of claim 5, wherein the sensing is limited to unlicensed spectrum.

8. The apparatus of claim 5, wherein the sensing includes both licensed and unlicensed spectrum.

9. A method for allocating radio resources for use by mobile user equipment (UE), comprising: sensing available radio spectrum resources; allocating at least a portion of the sensed available resources for use by at least one UE; and detecting changes in the position or path losses of at least one UE using radio resources in the service area of an eNodeB; and modifying the allocation of resources based at least in part on the detected changes in the position or path losses of at least one UE using radio resources in the service area of an eNodeB, wherein the allocation includes using a resource reservation signal having allocation coding with a set of flexible sensing operation window intervals, and wherein the resource reservation signal is used to reserve at least one channel on which availability of associated subframes is coded.

* * * * *